US009802323B2

(12) United States Patent
Louveau

(10) Patent No.: US 9,802,323 B2
(45) Date of Patent: Oct. 31, 2017

(54) SECURED MOTOR-DRIVEN ARTICULATED ARM WITH CABLE CAPSTAN

(71) Applicant: HAPTION, Soulge-sur-Ouette (FR)

(72) Inventor: Francois Louveau, Villiers-Charlemagne (FR)

(73) Assignee: HAPTION, Soulge-sur-Ouette (FR)

( * ) Notice: Subject to any disclaimer, the term of this patent is extended or adjusted under 35 U.S.C. 154(b) by 0 days.

(21) Appl. No.: 15/193,936

(22) Filed: Jun. 27, 2016

(65) Prior Publication Data

US 2016/0375587 A1    Dec. 29, 2016

(30) Foreign Application Priority Data

Jun. 26, 2015 (FR) ..................................... 15 56002

(51) Int. Cl.
| B25J 13/02 | (2006.01) |
| B25J 9/10 | (2006.01) |
| B25J 9/12 | (2006.01) |
| F16H 19/00 | (2006.01) |

(52) U.S. Cl.
CPC ............. *B25J 13/025* (2013.01); *B25J 9/102* (2013.01); *B25J 9/104* (2013.01); *B25J 9/12* (2013.01); *F16H 19/005* (2013.01); *Y10S 901/25* (2013.01)

(58) Field of Classification Search
CPC ............. B25J 9/12; B25J 13/025; B25J 9/104
See application file for complete search history.

(56) References Cited

U.S. PATENT DOCUMENTS

| 5,046,375 A | 9/1991 | Salisbury, Jr. et al. |
| 5,828,197 A | 10/1998 | Martin et al. |
| 5,898,599 A | 4/1999 | Massie et al. |
| 6,088,020 A * | 7/2000 | Mor ........................ G06F 3/016 318/628 |

(Continued)

FOREIGN PATENT DOCUMENTS

FR        2952573 A1    5/2011

OTHER PUBLICATIONS

English translation of the French Written Opinion dated Apr. 18, 2016 for corresponding French Application No. 1556002, filed Jun. 26, 2015.

(Continued)

*Primary Examiner* — William Kelleher
*Assistant Examiner* — Gregory Prather
(74) *Attorney, Agent, or Firm* — David D. Brush; Westman, Champlin & Koehler, P.A.

(57) ABSTRACT

A motor-driven articulated haptic interface arm includes: a frame; an arm linked to the frame and rotationally mobile about an axis; and a motor, which delivers at least one torque about the axis countering at least one part of forces applied to the arm by its environment. A main transmission transmits the torque to the arm and includes a capstan-type cable reducer, and an auxiliary transmission transmits the torque to the arm. The auxiliary transmission is capable of taking at least two states: an inactive state, when the forces applied to the arm by its environment are below a predetermined threshold, in which the auxiliary transmission transmits no torque to the arm; and an active state when the forces applied to the arm by its environment are higher than a predetermined threshold, in which the main transmission transmits no torque to the arm.

9 Claims, 3 Drawing Sheets

(56) References Cited

U.S. PATENT DOCUMENTS

| | | | | |
|---|---|---|---|---|
| 7,477,965 B2 * | 1/2009 | Soham | ............... | B25J 9/104 |
| | | | | 140/149 |
| 7,683,565 B2 * | 3/2010 | Quaid | ............... | B25J 9/1638 |
| | | | | 318/568.12 |
| 8,347,756 B2 * | 1/2013 | Bennett | ............ | A61B 17/32002 |
| | | | | 74/490.01 |
| 8,491,603 B2 * | 7/2013 | Yeung | ............... | B25J 9/047 |
| | | | | 606/130 |
| 8,771,270 B2 * | 7/2014 | Burbank | ............ | A61B 18/1445 |
| | | | | 606/51 |
| 8,821,480 B2 * | 9/2014 | Burbank | ............ | A61B 19/2203 |
| | | | | 606/1 |
| 8,950,286 B2 | 2/2015 | Gosselin et al. | | |
| 9,060,794 B2 * | 6/2015 | Kang | ............... | A61B 17/1622 |
| 9,254,178 B2 * | 2/2016 | Prisco | ............... | A61B 17/3421 |
| 2011/0003656 A1 | 1/2011 | Bennett et al. | | |

OTHER PUBLICATIONS

French Search Report and Written Opinion dated Apr. 18, 2016 for corresponding French Application No. 1556002, filed Jun. 26, 2015.

* cited by examiner

SECURED MOTOR-DRIVEN ARTICULATED ARM WITH CABLE CAPSTAN

1. FIELD OF THE INVENTION

The field of the invention is that of haptic interfaces, force-feedback systems, control arms for tele-operations and co-manipulation robots. The related field is that of automatons used to tasks of manipulating objects in space.

More specifically, the invention relates to a man-machine control element used to impede or follow the movement of an operator, especially in order to stimulate his sensory system at a kinesthetic level.

The invention has numerous haptic applications, such as for example remote operation, support in re-education, human/robot co-manipulation during medical surgery or industrial operations, the interconnection of a human being with a virtual reality environment.

2. PRIOR ART

Robots working in collaboration with human beings are increasingly being used in numerous fields of application.

Such robots can be used for example in keyhole surgery which consists especially in making small-diameter holes in a patient's body in order to slide in surgical tools in order to carry out surgical operations.

In this case, as in that of other applications, the robot has for example an articulated arm rotationally mobile relative to a frame, if necessary along several axes, and motors capable of transmitting torques about theses axes to the arm.

The arm is designed to carry a surgical instrument which will be moved by a surgeon during an operation. In order to stimulate the surgeon's haptic receptors during the operation so that he perceives the medium with which he is interacting during the operation, the robot is pre-programmed so that the motor or motors transmit drive torques or resistant torques to the arm, corresponding to the different areas (tissues, organs, nerves, etc.) of the medium in which the surgeon is acting. The motors thus make it possible to accompany (follow) or constrain (impede) the motions of the articulated arm and therefore those of the surgeon manipulating the arm. The surgeon thus receives force feedback during the operation.

To fulfill his role, the robot must not only transmit torques to the articulated arm via the motors but also control the forces and stresses that are applied to it by its environment, for example an operator such as a surgeon, so as to adapt the torques that the motors transmit. The robot is therefore force-controlled.

In the prior art, there are different known ways of force-controlling a robot. These include a technique using a mechanically reversible robot implementing motor-driven joints. These robots make it possible to obtain an efficient estimation of the forces, at the motors, that are applied to the extremity of the robot. The robot is indeed designed in such a way that its joints do not undergo friction. Thus, the forces applied to the extremity of the robot are transmitted through transmission chains up to the motors. Since the current flowing in the motors is proportional to the torque that they generate, it is possible, by measuring the currents flowing in the motors, to estimate the forces applied to the robot and to control the robot accordingly.

To ensure a high level of reliability in the evaluation of the forces, the friction in the joints of the robot must be very low. To this end, there are known ways of making direct-drive joints. However, for the joint to generate sufficient torques, the motors must be sized accordingly. They are then large-sized, and this adversely affects the compactness of the robot.

To use smaller-sized motors in order to improve the compactness of the robot, the torques delivered by the motors should be amplified (and their frequency of rotation should be reduced) by a reduction gear or reducer placed at the output of the motors. To this end, there are known ways of using cable reducers.

The cable reducers not only fulfill their primary reducer function efficiently but also have the advantage of not inducing any friction as would be the case for example with a gear reducer or a belt reducer. Indeed, a gear reducer would introduce friction between the teeth of the gearings. Besides, a slight pre-stress between the input and output shafts is generally used to minimize the transmission backlash. This pre-stress adds to the friction on the bearings and between the teeth in contact. A belt reducer too would introduce high friction. For the belt to work accurately, it must be tensed. This tension adds to the friction on the bearings of the input and output shafts. Besides, the belt applies friction to the pulleys when it reaches them and leaves them.

The document U.S. Pat. No. 5,046,375 describes an example of a cable reducer of the type comprising a pulley placed at the output of a motor, a pulley fixedly attached to the joint and a cable wound about the pulley fixedly attached to the motor in passing about the pulley fixedly attached to the joint. When the motor is put into rotation in one sense or the other, this rotationally drives the pulley fixedly attached to its shaft as well as the joint via the pulley fixedly joined to it and the cable.

Finally, there are known capstan-type cable reducers such as the one illustrated in FIG. 1.

This figure partially illustrates a motor-driven haptic interface articulated arm. This articulated arm has a frame 1 to which there is connected an arm 3 rotationally mobile about an axis 2 by means of a hinge 4. The arm 3 can be rotationally driven about the axis 2 by means of a motor 5 and a capstan-type cable reducer 6.

This reducer 6 comprises:
- a pulley 61 of small diameter called a "motor pulley" linked to the output shaft 51 of a motor 5;
- a pulley or pulley portion of greater diameter 62 called a "sector" which is fixedly attached to the articulated arm 3, and the axis of rotation of which is identical to that of the arm;
- a cable 63, the extremities of which are linked to the sector 62, extending along the sector 62, and being wound about the motor pulley 61.

The reduction ratio is determined by the ratio of the sum of the radius of the motor pulley 61 and the radius of the cable on the one hand and the sum of the radius of the sector 62 and the radius of the cable on the other hand.

Putting the motor into rotation induces a rotation of the motor pulley 61. The sector 62 then rotationally driven by the cable 63 at a lower speed in turn drives the articulated arm 3 rotationally about the axis 2 in transmitting a higher torque to the arm than the output torque from the motor 5.

Cable reducers and especially capstan-type cable reducers have the advantage of inducing very low friction. Indeed, the cable transmits forces tangentially to the axes of the pulleys. The guide bearings of the pulley are therefore not under load from the forces transmitted. The implementing of reducers of this type then efficiently provides for the reducer function and enables reliable measurement of the forces transmitted to the arm without the measurement being disturbed by high friction in the reducer.

The compactness of the robots is a major design criterion. Their designers therefore have been constantly trying to improve them in order to reduce the space requirement of the robots.

To carry out reliable transmission of motion from the pulley to the sector, steel cables are often used. The minimum winding radius of a cable on a pulley is given by the manufacturer of the cable. This minimum winding radius of the cable will therefore set the size of the motor pulley and therefore that of the sector. The most flexible steel cables currently accept winding radii equal to 16 times their radius.

Hence, to be able to improve the compactness of a robot, its designer will seek to reduce the radius of the motor pulley and therefore that of the cable.

However, for a given type of cable, the mechanical resistance is proportional to its radius. Indeed, the greater the radius of the cable, the higher its mechanical resistance.

Thus, improving the compactness of the robot and maintaining the mechanical resistance of the reducer are antagonistic goals.

In improving compactness, it will therefore be sought to reduce the size of the steel cable provided that it shows adequate behavior under load.

Since the compactness criterion is very important, it will most often be sought to reduce the diameter of the cable to the maximum extent. However, this gives rise to the risk that, if excessive force is exerted on the arm of the robot, the cable gets deformed. In extreme situations, this could lead to the breakage of the cable. The operation of the robot would be disturbed with consequences that are harmful or acceptable in varying degrees depending on the nature of the task performed.

However, for sensitive applications, for example for medical applications, this type of drawback must be avoided. To this end, a major factor of security in terms of behavior or resistance under load is necessary for the cables. This factor of security dictates the use of large-diameter cables and therefore major space requirement for the reducer which goes against the overall compactness of the robot.

The prior-art techniques therefore cannot be used to obtain a robot that is very compact and has high mechanical resistance. There is therefore a need in this direction.

3. SUMMARY

An exemplary embodiment of the present disclosure proposes a motor-driven articulated haptic interface arm comprising at least:
a frame;
an arm linked to said frame so as to be rotationally mobile about at least one axis, forces being liable to be applied to said arm by its environment;
motor means designed to deliver at least one torque about said axis countering at least one part of said forces applied to said arm by its environment;
a main transmission for the transmission to said arm of said torque about said axis, said main transmission comprising a capstan-type cable reducer;
an auxiliary transmission for the transmission to said arm of said torque about said axis, said auxiliary transmission being capable of taking at least two states:
an inactive state, taken so long as the forces applied to said arm by its environment against the effect of said torque are below a predetermined threshold, in which said auxiliary transmission transmits no torque to said arm;
an active state taken when said forces applied to said arm by its environment against the effect of said torque are higher than a predetermined threshold, in which said main transmission transmits no torque to said arm.

Thus, the invention consists in equipping an articulated haptic interface arm with a main transmission with cable reducer and an auxiliary transmission, the auxiliary transmission being implemented as a substitute for the main transmission with cable reducer when the forces applied to the arm by its environment become greater than a certain value.

The cable reducer can thus be sized as precisely as possible in order to optimize the compactness of the arm while at the same time ensuring a high mechanical worthiness or resistance, in other terms ensuring a high security factor when a force that is excessively high for the reducer is applied to the arm.

Implementing the invention thus procures an articulated haptic interface arm that is robust and compact, capable for example of finding application in sensitive fields such as especially the medical field.

The main transmission and the auxiliary transmission will preferably have identical reduction ratios, making it possible to have identical operation of the arm in terms of reduction, whichever of the transmissions is active.

According to one characteristic that can be envisaged, said auxiliary transmission is configured to take said active state when the forces applied by the environment to said arm against the effect of said torque induce a deformation of said cable that is above a predetermined threshold.

This threshold will be determined in such a way that the auxiliary transmission gets activated before the torque generated on the arm induces a deformation of the cable so as to cause it to deteriorate. Thus, the security and reliability of the arm according to the invention are guaranteed.

According to one characteristic that can be envisaged, said auxiliary transmission comprises a gear reducer.

This implementation is simple and robust.

According to one characteristic that can be envisaged, said main transmission comprises:
a drive element rotationally linked to said arm, said drive element comprising at least one angular sector, the axis of which coincides with the axis of rotation of said arm;
a drive pulley linked to said motor means;
said cable of said cable reducer extending along said angular sector in getting wound about said pulley, the extremities of said cable being fixed to said drive element.

Such a structure corresponds to that of a capstan-type reducer.

According to one characteristic that can be envisaged, said auxiliary transmission comprises:
a pinion linked to said motor means and mounted in the axis of the said pulley,
at least one toothed-wheel portion fixedly attached to said drive element and meshing with said pinion;
the reduction ratio of said auxiliary transmission being identical to that of said main transmission, the center distance between the axis of rotation of said pinion and the axis of rotation of said toothed wheel being greater than the center distance between the axis of rotation of said pulley and the axis of rotation of said drive element in such a way that said pinion and said wheel are in contact and mesh with each other only when said auxiliary transmission is in said active state.

According to one characteristic that can be envisaged, the difference between said center distances ranges from 0.1 to 0.5 times the height of the teeth of said pinion and of said wheel.

A difference in center distance, i.e. a clearance between the pitch diameters of the pinion and of the wheels included within this interval gives a high level of security in ensuring the engaging of the auxiliary transmission before the cable gets deteriorated.

According to one characteristic that can be envisaged, the difference dE between said center distances is determined according to the following formula:

$$dE = C\max / (K \cdot \sin(\alpha) \cdot F)$$

with
- alpha: angle of pressure of the gearing (pinion, wheel)
- K: stiffness of cable
- F: factor of security
- Cmax: maximum load on the cable According to one characteristic that can be envisaged, said arm is mounted so as to be rotationally mobile relative to said frame along a plurality of axes, said articulated arm comprising as many sets of motor means, main transmission means and auxiliary transmission means as there are axes around which said arm can rotate, each set of motor means, main transmission means and auxiliary transmission means being dedicated to the transmission of torque along one of said axes.

An arm according to the invention can thus have several degrees of freedom.

The present invention also covers applications of the arm according to any one of the variants explained here above to a technical field belonging to the group comprising:
- haptic interfacing with a virtual environment;
- haptic interfacing with an augmented reality environment;
- therapeutic re-education;
- computer-assisted design;
- teleoperation;
- sports training;
- training in technical gestures.

4. LIST OF FIGURES

Other features and advantages of the invention shall appear from the following description of particular embodiments, given by way of simple illustratory and non-exhaustive examples, and from the appended drawings, of which:

5. DESCRIPTION OF PARTICULAR EMBODIMENTS

Figure 1:
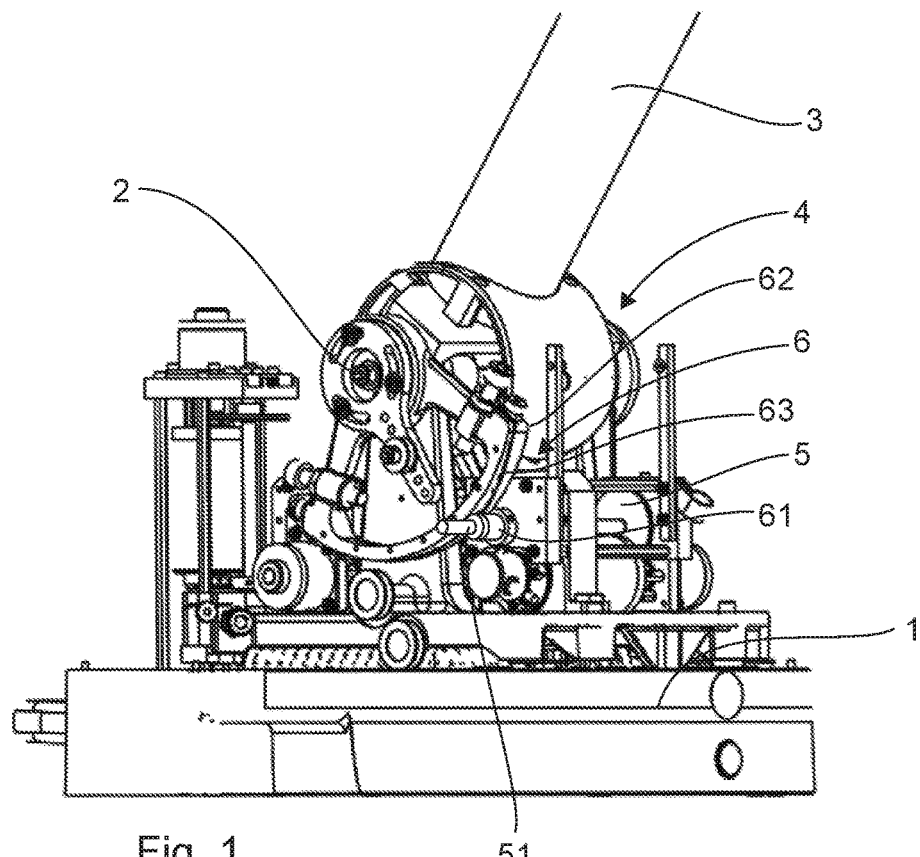
FIG. 1 illustrates a partial view in perspective of an articulated, haptic interface arm according to the prior art.
Figure 2:
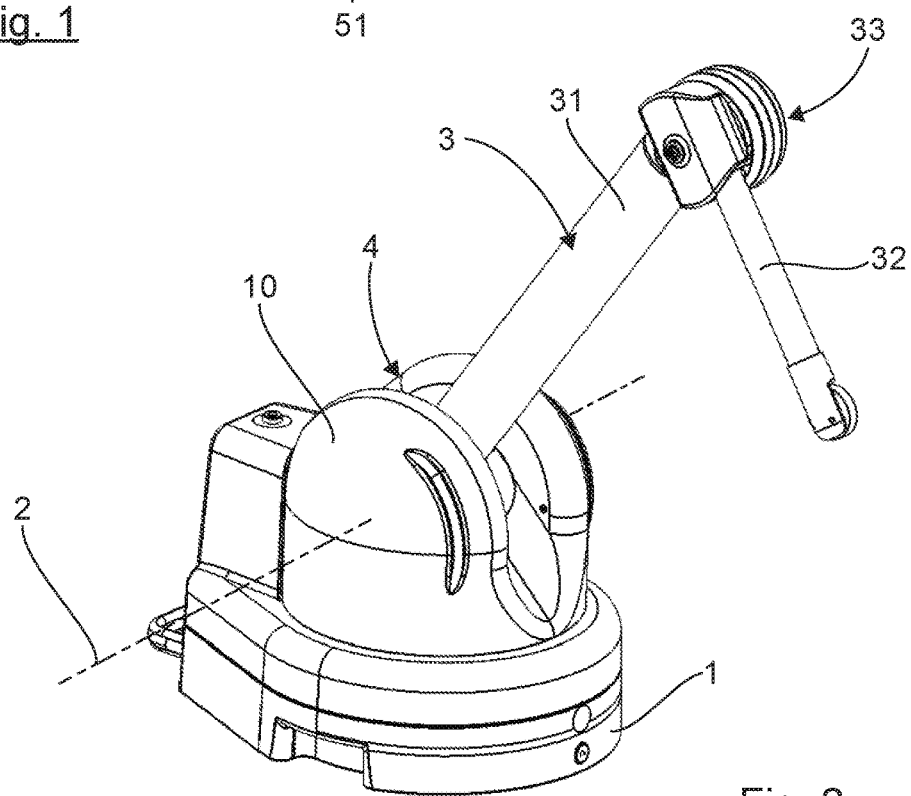
FIG. 2 illustrates a view in perspective of an articulated haptic interface arm according to the invention.
Figure 3:
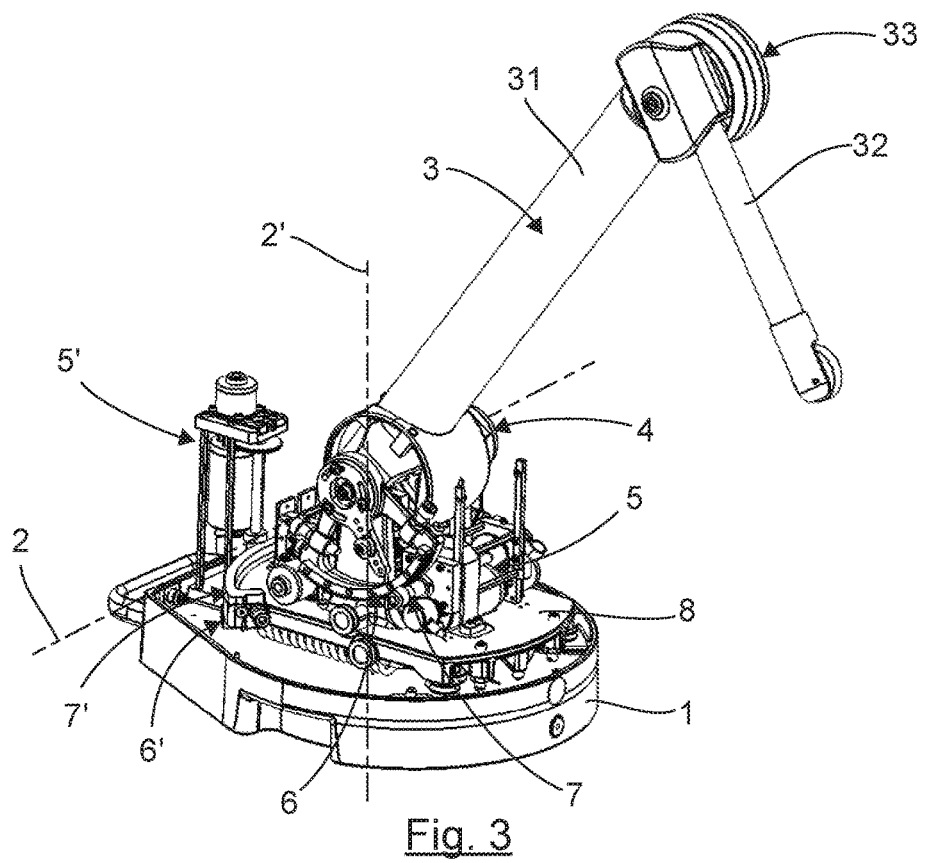
FIG. 3 illustrates the articulated arm of FIG. 2, from which the cover has been removed.
Figure 4:
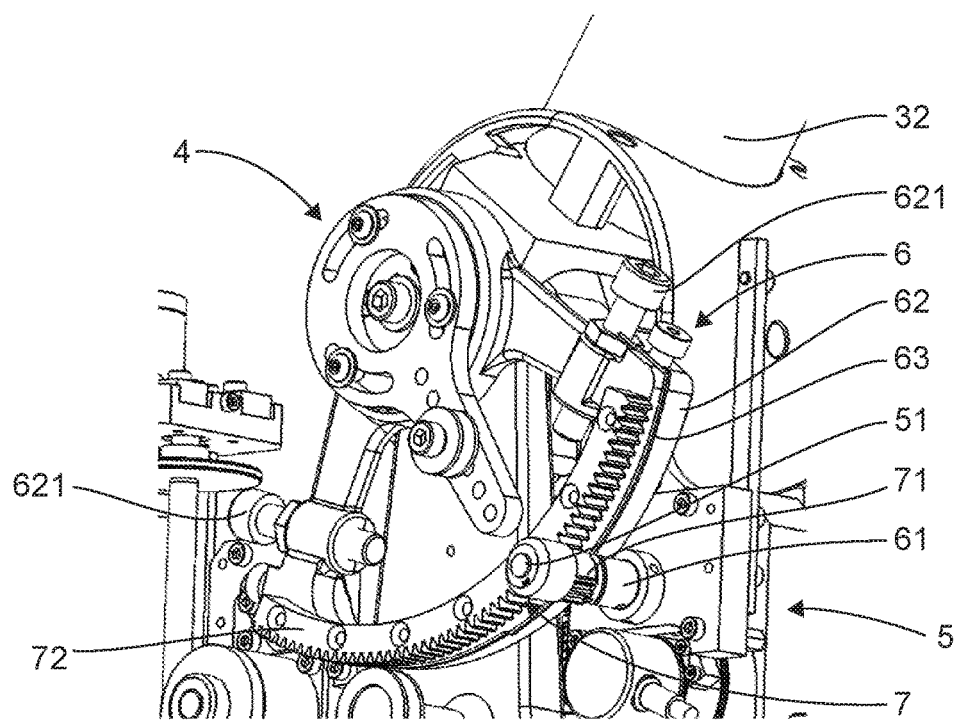
FIG. 4 illustrates a magnified view of the mechanism of transmission of the articulated arm of FIG. 3.
Figure 5:
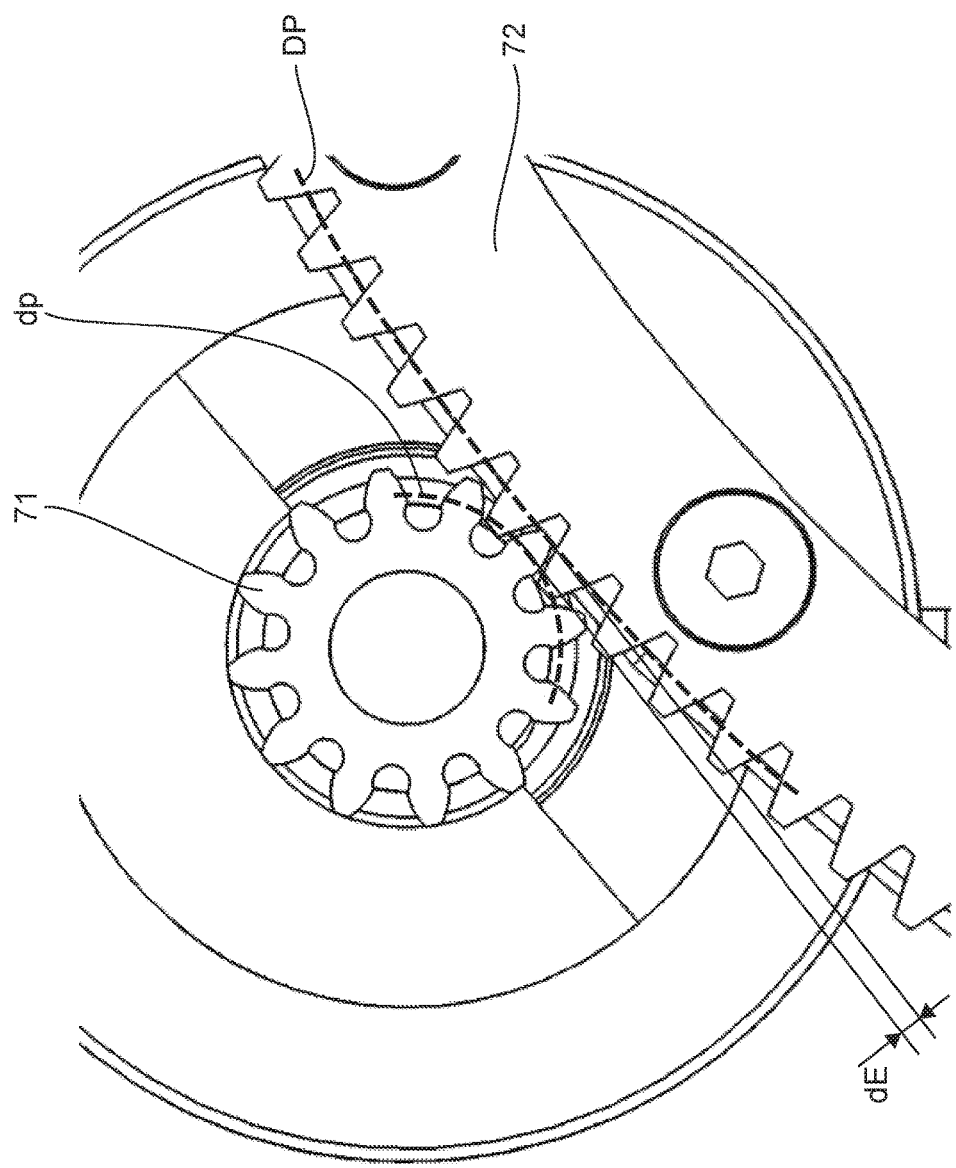
FIG. 5 illustrates a partial view of an example of a gear reducer of the auxiliary transmission of an articulated arm according to the invention in an inactive state in which there is a clearance between the gearings in such a way that they are not in contact.

Referring to FIGS. 2 to 5, we present an example of an embodiment of a motor-driven haptic interface articulated arm according to the invention.

As shown in these figures, a motor-driven articulated arm comprises a frame 1 and an arm 3 fixedly attached to the frame 1 so as to be rotationally mobile about an axis 2 by means of a joint 4. The transmission mechanism of the articulated arm is covered with a cover 10.

The arm 3 is to be put into motion about an axis 2 in order to accompany or constrain the motion of the external environment, such as for example an operator handling its extremity to carry out any task whatsoever such as for example a surgical operation, an object-manipulating operation, etc.

In this embodiment, the arm 3 comprises two arm portions 31, 32 articulated with one another by means of a joint 33. The arm 3 could clearly take any shape whatsoever adapted to the application in view. It could for example comprise a single articulated portion or more than two articulated portions.

The articulated arm comprises a motor means capable of being implemented to transmit torques about the axis 2 to the arm 3. In this embodiment, these motor means comprise an electrical motor 5. The torques delivered by the motor could be sometimes drive torques and sometimes resistant torques depending on whether it is desired to accompany or constrain the motion of the arm.

The articulated arm comprises a main transmission 6 for the transmission to the arm 3 of a torque about the axis 2 generated by the motor 5 and countering or not countering the motion communicated to the arm by its environment.

In this embodiment, the main transmission 6 comprises a cable reducer, in particular of a capstan type.

This cable reducer comprises classically a pulley 61 mounted so as to be fixedly attached in rotation to the output shaft 51 of the motor 5. It also has a pulley portion of greater diameter 52 also called a sector, fixedly attached in rotation to the arm 3 and having an axis of rotation that coincides with the axis 2. In one variant, the sector 2 could be replaced by a pulley. The reducer also has a cable 63. The free extremities of the cable are fixedly attached on either side of the sector 62 by means of screws 621 provided for this purpose. The cable 63 extends along the sector 62, more particularly the peripheral contour of this sector, in getting wound about the pulley 61.

According to the principle of operation of the capstan reducer, the distance between the axis of the pulley 61 and the axis of the sector 62 is greater than the sum of the following three quantities: the radius of the pulley 61, the radius of the sector 62 and the diameter of the cable 63. A gap of about 1 mm is often seen. This prevents the cable from rubbing simultaneously against the pulley and the sector.

The articulated arm furthermore comprises an auxiliary transmission 7 for transmitting a torque about the axis 2 generated by the motor and countering or not countering the motion communicated to the arm 3 by its environment.

This auxiliary transmission comprises a pinion 71 mounted so as to be fixedly attached in rotation to the output shaft 51 of the motor 5 in the extension of the pulley 63. It also has a toothed wheel portion 72 fixedly attached to the sector 62 and concentric with it. Its teeth form protrusions in the peripheral surface of the sector. In this variant, the toothed wheel portion could be replaced by a complete toothed wheel, especially when the sector is replaced by a pulley. The toothed wheel portion 72 is provided to mesh with the pinion 71. The pinion 71 and the toothed wheel 72 constitute a gear reducer.

The reduction ratio of the cable reducer of the main transmission is equal to that of the gear reducer of the auxiliary transmission. To this end, the pitch diameter of the pinion 71 is equal to the sum of the diameter of the pulley 61 and the diameter of the cable 63, and the pitch diameter of the toothed wheel portion 72 is equal to the sum of the diameter of the sector 62 and the diameter of the cable 63.

The auxiliary transmission 7 can take at least two states:
- an inactive state taken so long as the forces applied by the environment on the arm 3 against the effect of the torque generated by the motor 5 are below a predetermined threshold; in this state the auxiliary transmission transmits no torque to the arm; it is inactive;
- an active state, taken when the forces applied by the environment on the arm 3 against the effect of the torque generated by the motor 5 are above the predetermined threshold; in this state, the main transmission transmits no torque to the arm (it is inactive), the torque being transmitted to the arm only via the auxiliary transmission.

To this end, the center distance between the pinion 71 and the toothed wheel portion 72 is slightly increased as compared with the center distance between the pulley 61 and the sector 62. The pitch diameter DP of the pinion 71 is therefore neither secant or tangential with the pitch diameter DP of the toothed wheel portion 72. These pitch diameters are on the contrary slightly distant from each other. Thus, in the inactive state, there is a clearance between the teeth of the pinion and the teeth of the toothed wheel.

The adjusting of this difference between center distances could for example be obtained by mounting the motor on a support that can be shifted on a range of settings relative to the frame and kept in position after adjusting.

Thus, so long as the level of load applied by the environment of the robot on the arm against the effect of the torque generated by the motor is below a certain value, the pinion 71 is not in contact with the wheel portion 72. The transmission of torque to the arm 3 is then done by the main transmission 6 including the capstan reducer and not by the auxiliary transmission which is then in an inactive state.

If a major force is exerted on the arm by its environment, the cable 63 stretches without breaking until the teeth of the pinion 73 and of the toothed wheel portion 72 come into contact. The mechanical behavior or resistance of the joint is then ensured by the gearing system of the auxiliary transmission. The torque is then transmitted to the arm by the auxiliary transmission with a gear reducer which is in an inactive state and no longer by the main transmission with cable reducer which is inactive.

The clearance between the teeth of the gear reducer in the inactive state and the stiffness of the cable determine the borderline level of force needed to pass from operation in cable-reducer mode to operation in gear reducer mode This clearance will preferably range from 0.1 to 0.5 times the height of the teeth of the gearings. It will obviously be determined in such a way that the cable does not break before and during the phases when the auxiliary transmission becomes active. The elongation of the cable inducing the passage of the auxiliary transmission from its inactive state to its active state will preferably take place under elastic deformation.

This clearance between the pitch diameters of the pinion and the wheel, which is equal to the difference dE between the center distance between the axis of rotation of the pinion 71 and the axis of rotation of the toothed wheel portion 72 and the center distance between the axis of rotation of the pulley 61 and the axis of the rotation of the sector 62 can be determined for example as follows:

$$dE = C_{max}/(K \cdot \sin(alpha) \cdot F)$$

with
- alpha: angle of pressure of the gearing
- K: stiffness of cable
- F: safety factor
- Cmax: maximum load on the cable The invention therefore provides for transparency and fluidity of the cable reducer so long as the forces on the arm remain weak, and high mechanical resistance of the gear reducer when the load on the arm becomes greater.

Thus, through the invention, it is possible to choose a small-sized cable and thus improve the compactness of the joint while at the same time ensuring its mechanical behavior.

In addition if, despite the implementation of the invention, the cable arrives breaks through mechanical fatigue, the transmission will always be ensured by the auxiliary transmission. Given the clearance and the friction in the auxiliary transmission, the working of the arm will be less precise. However, the arm will then work in downgraded mode, ensuring that the user will not be allowed to take action in a risky zone.

It may be recalled that the invention can be applied to a device for putting a haptic interface into mobility.

By way of an indication, such a device for putting a haptic interface into a state of mobility can be implemented for the re-education of a patient's arm or again for co-manipulation during a surgical operation.

Naturally, the embodiments of the device according to the invention that are possible and that can be envisaged are numerous.

In other particular embodiments it is possible, without departing from the framework of the invention, to envisage implementing such a device to provide a simple haptic interface intended for example for applications of tele-operation, video games, virtual reality, computer-assisted design, sports training or training in technical gestures. According to another application that can be envisaged, it can be planned to integrate a device for putting a tool-changer into motion where the object to be moved or to manipulated is an articulated clamp. According to yet another application that can be envisaged, a maneuvering element such as a manipulating robot advantageously incorporates a device according to the invention.

In variants, one or more intermediate reducers could be implemented between the output of the motor and the shaft on which the motor pulley is mounted.

For reasons of mechanical balance, a main transmission/auxiliary transmission pair could be implemented on either side of the articulation connecting the arm to the frame.

In the embodiment described here above, the arm is rotationally mobile relative to the frame along a single axis. In variants, it could be rotationally mobile relative to the frame along several axes. In this case, the motor-driven articulated arm will comprise as many sets or pairs of sets of motor means, main transmission means and auxiliary transmission means as there are axes around which the arms can rotate, each set comprising motor means, main transmission means and auxiliary transmission means being dedicated to the transmission of torque along one of said axes.

The arm could for example be a rotationally mobile relative to the frame along a first axis 2 and along a second axis 2' orthogonal to the first axis, a first set or pair of sets of drive means 5, main transmission 6 and auxiliary transmission 7, being dedicated to the transmission of torque along the first axis 2 and a second set or pair of sets of motor means 5', main transmission means 6' and auxiliary transmission means 7' being dedicated to the transmission of torque along the second axis 2'.

For example, if the arm 3 is rotationally mobile about the two different axes 2 and 2', the set constituted by the mobile arm 3 along the first axis 2, the main transmission 6, auxiliary transmission 7 and motor 5 could be mounted on a plate or deck 8 rotationally mobile relative to the frame 2 along a first axis 2'. The motor-driven arm could then include another motor 5' as well as another main transmission 6' and another auxiliary transmission 7' to drive the plate 8 rotationally about this axis 2' following the same principle as the one according to which the torque of the motor 5 is transmitted to the arm 3 along the first axis 2.

The arm 3 could naturally be rotationally mobile relative to the frame 2 along both axes.

An exemplary embodiment provides an efficient solution to at least some of the different problems of the prior art.

An exemplary embodiment provides an articulated haptic interface arm with a cable reducer that is compact and resistant.

At least one embodiment improves the compactness of such an articulated arm while ensuring a high factor of security.

At least one embodiment provides an articulated arm of this kind that is simple in design and/or easy to implement.

Although the present disclosure has been described with reference to one or more examples, workers skilled in the art will recognize that changes may be made in form and detail without departing from the scope of the disclosure and/or the appended claims.

The invention claimed is:

1. A motor-driven articulated haptic interface arm comprising at least:
    a frame;
    an arm linked to said frame so as to be rotationally mobile about at least one axis, forces being liable to be applied to said arm by its environment;
    a motor, which delivers at least one torque about said axis countering at least one part of said forces applied to said arm by its environment;
    a main transmission for the transmission to said arm of said torque about said axis, said main transmission comprising a capstan-type cable reducer;
    an auxiliary transmission for the transmission to said arm of said torque about said axis, said auxiliary transmission being capable of taking at least two states:
        an inactive state, taken so long as the forces applied to said arm by its environment against the effect of said torque are below a predetermined threshold, in which said auxiliary transmission transmits no torque to said arm;
        an active state, taken when said forces applied to said arm by its environment against the effect of said torque are higher than a predetermined threshold, in which said main transmission transmits no torque to said arm.

2. The articulated arm according to claim 1 wherein said auxiliary transmission is configured to take said active state when the forces applied by the environment to said arm against the effect of said torque induce a deformation of said cable that is above a predetermined threshold.

3. The articulated arm according to claim 1, wherein said auxiliary transmission comprises a gear reducer.

4. The articulated arm according to claim 3, wherein said main transmission comprises:
    a drive element rotationally linked to said arm, said drive element comprising at least one angular sector, the axis of which coincides with the axis of rotation of said arm;
    a drive pulley linked to said motor;
    said cable of said cable reducer extending along said angular sector in getting wound about said pulley, the extremities of said cable being fixed to said drive element.

5. The articulated arm according to claim 4, wherein said auxiliary transmission comprises:
    a pinion linked to said motor means and mounted in the axis of the said pulley,
    at least one toothed-wheel portion fixedly attached to said drive element and meshing with said pinion;
    the reduction ratio of said auxiliary transmission being identical to that of said main transmission, the center distance between the axis of rotation of said pinion and the axis of rotation of said toothed wheel being greater than the center distance between the axis of rotation of said pulley and the axis of rotation of said drive element in such a way that said pinion and said wheel are in contact and mesh with each other only when said auxiliary transmission is in said active state.

6. The articulated arm according to claim 5, wherein the difference between said center distances ranges from 0.1 to 0.5 times the height of the teeth of said pinion and of said wheel.

7. The articulated according to claim 5 wherein the difference between said center distance is determined according to the following formula:

$$dE = C\text{max}/(K \cdot \sin(\text{alpha}) \cdot F)$$

with
    alpha: angle of pressure of the gearing
    K: stiffness of cable
    F: factor of security
    Cmax: maximum load on the cable.

8. The articulated arm according to claim 1 wherein said arm is mounted so as to be rotationally mobile relative to said frame along a plurality of axes, said articulated arm comprising as many sets of motors, main transmissions and auxiliary transmissions as there are axes around which said arm can rotate, each set of motor, main transmission and auxiliary transmission being dedicated to the transmission of torque along one of said axes.

9. The articulated arm according to claim 1, wherein the arm is applied to a technical field belonging to the group consisting of:
    haptic interfacing with a virtual environment;
    haptic interfacing with an augmented reality environment;
    therapeutic re-education;
    computer-assisted design;
    teleoperation;
    sports training;
    training in technical gestures.

* * * * *